Sept. 15, 1959                A. MEIXNER                2,903,953
                          PHOTOGRAPHIC CAMERA
                          Filed Oct. 18, 1957
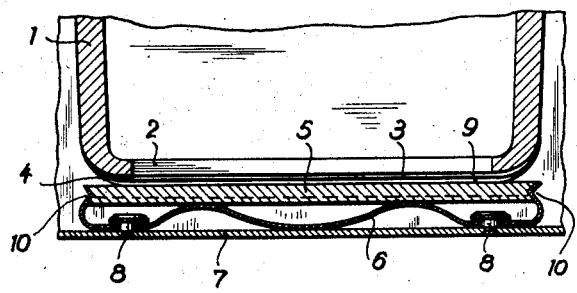
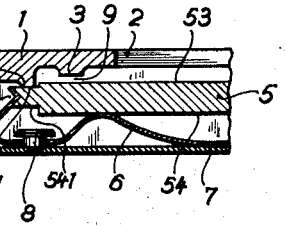
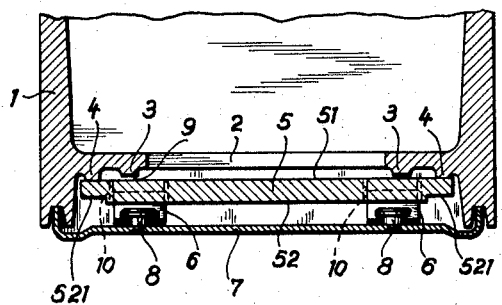
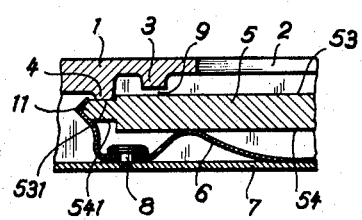
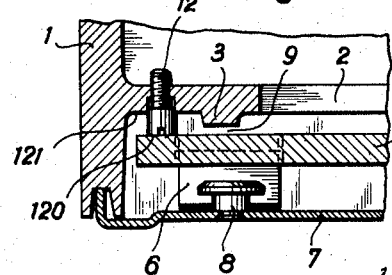
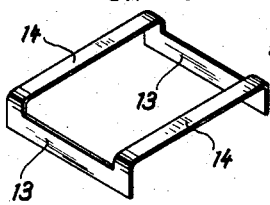
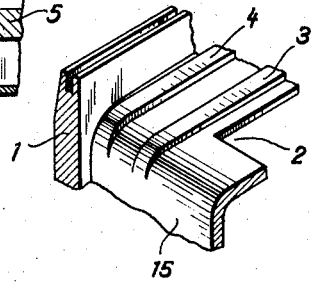
INVENTOR
ALFRED MEIXNER
BY
ATTORNEYS

| United States Patent Office | 2,903,953
Patented Sept. 15, 1959 |
|---|---|

2,903,953

PHOTOGRAPHIC CAMERA

Alfred Meixner, Braunschweig, Germany, assignor to Voigtlander A.G., Braunschweig, Germany, a corporation of Germany Application October 18, 1957, Serial No. 691,039

Claims priority, application Germany October 20, 1956

4 Claims. (Cl. 95—31)

This invention relates to photographic cameras and it has particular relation to photographic cameras, in which the film is guided in the range of an image window in a channel formed between the film guiding surface of the camera casing and a film guide plate.

The inside width of this channel is selected in conformity with the thickness of the material of rollfilms available in commerce in such a manner that, upon their advance, the rollfilms can slide through this channel with as little friction as possible and are held in plane or flat position in the film channel during stand-still of the film. The plane or flat condition of the film is not assured if the thickness of the rollfilm material is below a predetermined value. Thus, a rollfilm which consists of a thinner material than the conventional commercial rollfilms could be arched in a film channel of conventional inside width and this would cause an undesired lack of sharpness in pictures to be taken.

A main object of the present invention is, therefore, to construct a rollfilm camera provided with a film guide channel, in such a manner that rollfilms of varying material thickness can be moved with low friction and at the same time held in plane or flat condition in said film guide channel. It is contemplated according to the present invention to provide film guide channels of such structure that rollfilms of conventional material thickness, as well as films having a material thickness which is different, e.g. lower, than the conventional thickness should be movable with low friction and held in plane or flat condition in said channel.

It is another object of the present invention to provide film guide channels, the inside width of which is variable.

Modification of the inside width of the film guide channel according to the present invention can be carried out by various means and in various manners, whereby the operator of the camera should be enabled to adjust the inside width of the film guide channel to the material thickness of the film used in the individual case, by means of simple manipulation by hand.

In carrying out the present invention, the inside width of the film guide channel may be adjustable continuously. However, it is also contemplated according to the invention to render the film guide channel adjustable only to two or more predetermined inside widths.

The conventional film guide channels in rollfilm cameras are designed in such a manner that the film guide plate is held under spring effect against bearing or contact surfaces on the camera body. These bearing or contact surfaces are dimensionally adjusted to the bearing surfaces of the film guide plate in such a manner that the film guide plate is held relative to the film guide surface of the camera body, at a distance which is adjusted to the normal film thickness. In order to obtain continuous adjustability of the inside width of the film guide channel according to the invention, the bearing surfaces located on the camera casing for the film guide plate, are adjustably arranged on the camera casing with regard to their level of altitude relative to the film guide surface. These bearing or contact surfaces may, for example, consist of heads of screws which are seated in the camera casing and are adjustable with regard to their level of altitude relative to the camera casing, by screwing them to a lower or higher depth into the camera casing. However, such screws can be screwed in also in the film guide plate and come in contact with their heads with surfaces of the camera casing, so that by adjusting the screws the inside width of the film guide channel can be modified. In order to secure uniform adjustment of all screws provided for in the above described manner, the surface of the screws and the portions of the camera casing surrounding them, or of the film guide plate, can be provided with registering marks.

According to a modification of the invention, variation of the inside width of the film guide channel can be attained also by a corresponding design of the film guide plate. The film guide plate can be reversible in its mounting, so that in one of its positions it is turned with one of its sides to the image aperture, while in its other position its other side is turned to the image aperture. Thereby, those surfaces of the film guide plate which come in contact with the rollfilm, have different levels of altitude relative to those surfaces of the film guide plate, which come in contact with the counter-surfaces of the camera casing. Thus, in one position of the film guide plate between the latter and the film guide surface on the camera casing a film guide channel of predetermined indifferent inside width is formed between the film guide plate, a film guide channel of likewise predetermined but different inside pidth is formed between the film guide plate and the film guide surface on the camera casing.

The reversible character of the film guide plate can be obtained by arranging it on at least one leaf spring fastened to the camera back wall, whereby the free ends of the leaf spring grip the longitudinal edges—or also the narrow edges—of the film guide plate and are fixed to bearing surfaces located on the surfaces of these edges. These bearing surfaces may consist of detent notches provided on edge surfaces of the film guide plate, which are engaged by the bent free edges of the leaf spring or leaf springs. However, the edge surfaces of the film guide plate may be also provided with wedge-shaped lugs which are gripped by correspondingly bent free ends of the leaf spring or springs. Thus, the film guide plate is pressed, in a manner known by itself, against the bearing or contact surfaces on the camera casing.

Furthermore, changes of the inside width of the film guide channel can be brought about also by changes applied to the film guide surface of the camera casing. This can be done, for example, by a mask which can be inserted in the film guide channel and by which the inside width of the film guide channel is reduced. Such a mask can be provided with bent frame pieces, which are fixed on walls of the camera casing, located laterally of the image aperture. The frame pieces are connected with each other by means of narrow crosspieces, which come in contact with the film guide surfaces, e.g. ledges of the camera casing and thereby affect the inside width between these film guide surfaces and the film guide plate, i.e. diminish this width in accordance with the thickness of said crosspieces to a varying extent.

The appended drawings illustrate by way of example some embodiments of and best ways for carrying out the invention, to which the invention is not limited.

In the drawings

Figure 1 illustrates in lateral sectional view the film channel guide path of a photographic camera;

Figure 2 illustrates the film channel guide path shown in Figure 1, the top view in section;

Figure 3 is the partial illustration of fixing the film guide plate on leaf springs, in a specific manner;

Figure 4 is the partial illustration of another arrangement for fixing the film guide plate on leaf springs;

Figure 5 shows in partial illustration a film channel, the inside width of which can be changed continuously;

Figure 6 is the perspective view of a mask adapted to be inserted in the film guide channel; and Figure 7 shows in perspective view part of the film guide path on the camera casing.

Referring now to the drawings in detail, reference symbol 1 denotes a camera casing in the drawings, in which only a part of the camera casing 1, which contains the image aperture 2, is shown. On the rearward wall of the camera casing on its side turned away from the picture taking objective, two film guide ledges 3, 3 extend in the direction of movement of the film, along the image aperture 2. Parallel with ledges 3, but at a different level of altitude relative to said ledges, bearing ledges 4 extend, against which a film guide plate 5 rests. This film guide plate 5 is held by two leaf springs 6, said springs being fastened to camera rear wall 7 (which is capable of being hinged down) by means of rivets 8. In the closed position, shown in the drawing, of the camera rear wall 7, the film guide plate 5 is held by the effect of leaf springs 6, against bearing ledges 4. Between the film guide plate 5 and film guide ledges 3 a film guide channel 9 is thus formed, the inside width of which is determined in such a manner that the roll film (not shown in the drawing for the sake of clarity) which rests and moves in this channel, is guided and held with low friction and in plane condition. With reference to the illustration in Fig. 1, movement of the film has to be assumed from left to right and vice versa, and in Fig. 2 in a right angle to the plane of the drawing. Instead of the bearing ledges 4, individual bearing points or bearing surfaces, can also be used. It should be noted that in Fig. 1, the direction of movement of the film is parallel with the plane of the drawing, while in Fig. 2 this direction forms a right angle with said plane.

In order to change the inside width of the film guide channel 9 and thus adapt it to different thicknesses of the film material, detent notches 10 are provided in the edge surfaces of the film guide plate 5 as shown in Figs. 1-3. Said notches are elastically engaged by the correspondingly bent free ends of leaf springs 6, whereby the film guide plate 5 is elastically fixed in its level of altitude relative to the rear wall 7. By expanding the free ends of leaf springs 6, the film guide plate can be removed from this mounting and can be inserted again after a turn of 180°.

As shown in Figs. 1 and 2, in the film guide plate 5 the surface 51 which is turned toward image aperture 2, is plane over its entire surface, while surface 52, which is turned away from the image aperture, is somewhat recessed at 521, 521, i.e. at those portions which stand opposite the bearing ledges 4. Upon turning the film guide plate 5 shown in Figs. 1 and 2, surface 521 comes in contact with bearing ledges 4, so that the film guide channel formed between surface 52 and film guide ledges 3 has then a smaller inside width than the film guide channel 9 shown in the drawing. The extent by which the channel is narrowed, corresponds to the extent by which the surface 52 stands out on the marginal portions relative to the offset surface 521.

In Fig. 3, both sides 53 and 54 of the film guide plate 5 are provided on the marginal portions with recessed surfaces 531 and 541, whereby the surface 541 is carved deeper by a predetermined extent than surface 531. Depending on the position to which film guide plate 5 has been turned, the film guide channel formed between surfaces 53 and 54, respectively, and film guide ledges 3, will have different inside widths. While in the example illustrated in Figs. 1 and 2 the leaf springs 6 extend in the direction of movement of the film in the example shown in Fig. 3 they extend in a right angle to the direction of the film movement, which last mentioned direction is supposed to form a right angle with the plane of the drawing here, as well as in Figs. 4 and 5.

The film guide plate 5 shown in Fig. 4 differs from the example shown in Fig. 3 by the manner in which it is fixed to leaf spring 6. In Fig. 4 the film guide plate 5 is provided with wedge-shaped extensions 11, which are gripped by the correspondingly bent ends of leaf springs 6. Like in the example shown in Fig. 3, surfaces 53 and 54 are provided also in this case with offset portions 531 and 541 of differing depths at the marginal portions of film guide plate 5, so that, depending on the position to which plate 5 is turned, a film guide channel of larger or smaller inside width is formed.

In the examples described above, the inside width of the film guide channel is determined by the design of the film guide plate. It is thereby possible to form film guide channels of two different inside width. By laying on or fixing of metal strips, or the like, on surfaces 521, 531, 541, additional graduations of the channel width can be attained.

In the example according to Fig. 5, the inside width of the film guide channel can be continuously changed. In this embodiment of the invention, between two limits, any desired number of film guide channels of varying inside width can be adjusted, whereby modification of the inside width is effected by changes on the bearing surfaces of the film guide plate, on the camera casing.

In contrast to the above described embodiments, in Fig. 5, the plane film guide plate 5 does not rest at its marginal portions on rigid bearing ledges or surfaces (i.e. parts 4 in Figs. 1–4), but on the heads of adjusting screws 12 seated in camera casing 1, only one of these screws being shown in Fig. 5. In order to change the inside width of the film guide channel 9 formed between the film guide plate 5 and the film guide ledges 3, merely the corresponding adjustment of screws 12 is necessary. The screw head is preferably provided with a mark 120, which is adjusted, but turning the screw, to a scale 121 provided on the camera casing, whereby a predetermined channel width corresponding to the film type used is obtained.

The adjusting screws 12 can be seated also in the film guide plate 5, so that their heads come in contact with the camera casing 1. Instead of screws, adjustable wedges or equivalent elements can be used in carrying out the invention.

Figures 6 and 7 illustrate a further example, in which changes of the inside width of the film guide channel, are brought about by changes on the film guide surface of the camera casing.

Figure 7 illustrates, in perspective view, a part of the film guide surface provided on the camera casing. A corner of image aperture 2 and one of the film guide ledges 3, which extend parallel to the direction of movement of the film, and one of the two bearing ledges 4 for the film guide plate, which is not shown, can be seen in Fig. 7. The surfaces of film guide ledges 3 and of bearing ledges 4, extend in different planes relative to the camera casing 1.

Figure 6 illustrates a mask in perspective view. This mask is a frame-like body having two bent side parts 13, 13 and two crosspieces 14, 14, which connect members 13, 13. The dimensions of this mask are selected in such a manner that upon placing it on the film guide surface of camera casing 1, the crosspieces 14, 14 come to lie on the film guide ledges 3, while members 13, 13 come in contact with the camera casing walls extending on both sides at the transverse edges of image aperture 2, the wall shown in Fig. 7 being denoted 15. Thereby the mask is non-displaceably fixed on the film guiding surface. The size, by which the inside width of the film guide channel becomes reduced upon insertion of the mask, is determined by the thickness of the material of crosspieces 14. Masks consisting of material of varying thickness can be used, selected and inserted in accordance with the requirements in each individual case.

The mask shown in Fig. 6 may be given also such dimensions that its crosspieces 14 come to lie against bearing ledges 4 when the mask is applied on the image aperture 2 to the camera casing 1. The film guide plate 5, which comes to lie against the camera casing 1 upon closing camera rear wall 7, does not come in direct contact then with bearing ledges 4 and will lie against parts 14 of the mask, whereby it is held from film guide ledges 3 at a distance which is greater by the thickness of the material of crosspieces 14. Thereby the inside width of the film guide channel is increased by the thickness of the material of crosspieces 14.

In this case, the mask can be fixed also on film guide plates 5 in such a manner that its side members 13 laterally span the film guide plate 5 and crosspieces 14 extend in such a way that they come in contact with bearing ledges 4 at closed camera rear wall 7, whereby, also in this case, the width of film guide channel 9 is increased by the thickness of material of members 14.

A combination of the examples shown in Figures 1–4 with the example according to Figs. 6 and 7 result in film guide channels of at least four different inside widths.

It will be understood from the above that this invention is not limited to the specific constructions, arrangements, designs and other details specifically described above and illustrated in the drawings and can be carried out with various modifications without departing from the scope of the invention as defined in the appended claims.

What is claimed is:
1. Photographic camera comprising an image aperture, a film guide surface on the camera casing, a film guide plate, and means for guiding a roll film in a channel defined by said film guide surface and said film guide plate; a mount for said film guide plate, adapted to receive said film guide plate reversibly between a first position, in which a first side surface of the film guide plate is turned toward the image aperture, and a second position, in which the opposite side surface of the film guide plate is turned toward the image aperture; parts of the film guide plate side surface which lie against the film, having a different level of altitude from other parts of the same side surface, which come to lie against, and are supported by, the camera casing, on at least one side surface of the film guide plate, and the level of altitude of the film guide plate parts which are supported by the camera casing, being different on said first side surface and the opposite side surface, respectively, of the film guide plate.

2. Photographic camera as claimed in claim 1, having a rear wall; the film guide plate being held by at least one leaf spring fastened to said rear wall, whereby bent free ends of the leaf spring grip edges of the film guide plate and are fixed in bearing points provided on said edges.

3. Photographic camera as claimed in claim 2, in which edges of the film guide plate are provided with detent notches adapted to be engaged by bent free ends of the leaf spring.

4. Photographic camera as claimed in claim 3, in which edges of the film guide plate are provided with wedge-shaped projecting portions adapted to be gripped by free ends of the leaf spring.

References Cited in the file of this patent
UNITED STATES PATENTS

| 2,645,170 | Heidecke | July 14, 1953 |

FOREIGN PATENTS

| 24,157 | Great Britain | 1907 |